United States Patent
Guo et al.

(10) Patent No.: US 12,452,437 B1
(45) Date of Patent: Oct. 21, 2025

(54) FAST PARAMETER SEARCH FOR CHROMA FROM LUMA INTRA PREDICTION IN VIDEO CODING

(71) Applicant: Zoom Video Communications, Inc., San Jose, CA (US)

(72) Inventors: Yi Guo, Hangzhou (CN); Zhichu He, Hangzhou (CN); Rui Li, Hangzhou (CN); Bo Ling, Saratoga, CA (US); Jing Wu, Hangzhou (CN); Minxia Yang, Hangzhou (CN); Shiyan Zhang, Hangzhou (CN); Yichen Zhang, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 278 days.

(21) Appl. No.: 18/223,893

(22) Filed: Jul. 19, 2023

(51) Int. Cl.
| | |
|---|---|
| H04N 19/186 | (2014.01) |
| H04N 19/147 | (2014.01) |
| H04N 19/159 | (2014.01) |
| H04N 19/176 | (2014.01) |

(52) U.S. Cl.
CPC ......... *H04N 19/186* (2014.11); *H04N 19/147* (2014.11); *H04N 19/159* (2014.11); *H04N 19/176* (2014.11)

(58) Field of Classification Search
CPC .. H04N 19/186; H04N 19/147; H04N 19/159; H04N 19/176
USPC ..................................................... 375/240.13
See application file for complete search history.

(56) References Cited

U.S. PATENT DOCUMENTS

| | | | |
|---|---|---|---|
| 11,394,987 B2 | 7/2022 | Aggarwal et al. | |
| 2021/0377544 A1 | 12/2021 | Holcomb et al. | |
| 2021/0409706 A1 | 12/2021 | Zhao et al. | |
| 2022/0201283 A1* | 6/2022 | Lee | H04N 19/124 |
| 2023/0104243 A1* | 4/2023 | Zhao | H04N 19/593 375/240.08 |
| 2023/0336748 A1* | 10/2023 | Ye | H04N 19/70 |
| 2023/0421786 A1* | 12/2023 | Aggarwal | H04N 19/42 |
| 2024/0080443 A1* | 3/2024 | Ye | H04N 19/186 |

(Continued)

OTHER PUBLICATIONS

"Aom—Git at Google (googlesource.com)", Alliance for Open Media, retrieved from internet from https://aomedia.googlesource.com/aom, Jul. 19, 2023, 12 pages.

(Continued)

*Primary Examiner* — Christopher S Kelley
*Assistant Examiner* — Ana Picon-Feliciano
(74) *Attorney, Agent, or Firm* — Kilpatrick Townsend & Stockton, LLP

(57) ABSTRACT

Fast parameter search for chroma from luma (CFL) intra prediction in video encoding is provided. A video encoder determines a value of a parameter of a linear CFL predictor for a coding block of a frame of a video. The determining includes dividing a search range within a value range of the parameter into three portions by a starting value: the starting value and values on two sides of the starting value. The encoder determines cost values of parameter values from the three portions and select the value of the parameter that corresponds to the lowest cost value. The encoder further encodes the coding block of the frame into a bitstream representing the video using the CFL predictor with the selected value of the parameter.

20 Claims, 7 Drawing Sheets

(56) References Cited

U.S. PATENT DOCUMENTS

2024/0357090 A1* 10/2024 Wu .................. H04N 19/593

OTHER PUBLICATIONS

Chen, et al., "An Overview of Core Coding Tools in the AV1 Video Codec", 2018 Picture Coding Symposium (PCS), San Francisco, CA, USA, 2018, pp. 41-45.
Midtskogen, et al., "The AV1 Constrained Directional Enhancement Filter (CDEF)", 2018 IEEE International Conference on Acoustics, Speech and Signal Processing (ICASSP), Sep. 13, 2018, 5 pages.
Trudeau, et al., "Predicting Chroma from Luma in AV1", Retrieved from Internet from https://arxiv.org/abs/1711.03951; cited as arXiv:1711.03951v1, Nov. 10, 2017, 8 pages.

* cited by examiner

FAST PARAMETER SEARCH FOR CHROMA FROM LUMA INTRA PREDICTION IN VIDEO CODING

FIELD

The present application relates to digital video encoding, for example, encoding that can be used to efficiently send video from one device to another over a network for videoconferencing. More specifically, the present application relates to video encoding to improve bandwidth efficiency while maintaining video quality.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION OF THE DRAWINGS

Figure 1:
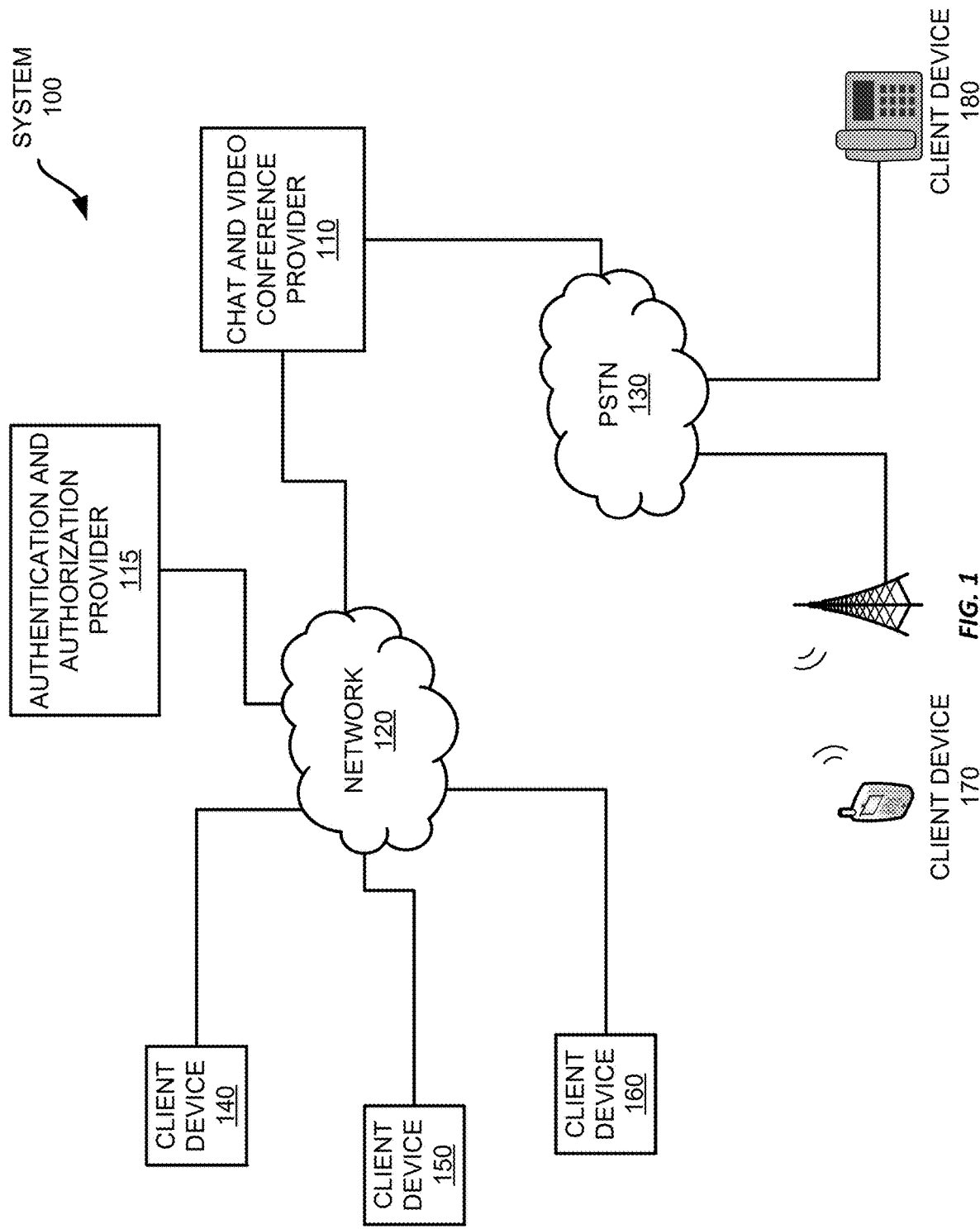
FIGS. 1-3 illustrate example systems to enable videoconferencing with fast parameter search for chroma from luma intra prediction in video coding as described herein.

Examples are described herein in the context of systems and methods for providing fast parameter search for chroma from luma (CfL) intra prediction in video coding. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Online conferencing systems enable their users to create and attend conferences (or "meetings") via various types of client devices. After joining a meeting, the participants receive audio and/or video streams or feeds (or "multimedia" streams or feeds) from the other participants and, in the case of a videoconference, are presented with views of the video feeds from one or more of the other participants and audio from the audio feeds. Using these different modalities, the participants can see and/or hear each other, engage more deeply, and generally have a richer experience despite not being physically in the same space.

In the case of videoconferencing systems, to create a meeting, a person (referred to as the "host" or "meeting host") accesses the videoconferencing system, schedules a new meeting, and identifies one or more other people to invite to the meeting. In response to the host creating the meeting, the videoconferencing system establishes the meeting by creating a meeting identifier and, if desired, a passcode or other access control information. The host can then send the meeting identifier (and access control information) to each of the invitees, such as by email. Once the meeting is started, the invitees can then access and join the meeting using the meeting identifier and any provided access control information. The initial host, or the main host, can, in some systems, make another participant a co-host. For purposes of the discussion herein, the term "host" encompasses hosts and co-hosts. Hosts can manage and control the videoconferencing session.

To provide higher video quality for users of modern digital telecommunication platforms and applications within the bounds of computing and network limitations, a videoconferencing system according to this disclosure efficiently encodes video using chroma from luma (CFL) prediction. CFL prediction is an intra prediction technique that models chroma pixels as a linear function of the coincident reconstructed luma pixels. The CFL prediction process includes a set of parameters, which can be selected during the encoding process. CFL prediction as described herein includes the selection of at least one of these parameters in a way that reduces the amount of searching for the best value for the parameter. This reduction improves the speed of the search and thus reduces the computational complexity of the CFL prediction process.

When used within a videoconferencing system, the video encoding described herein produces a video data stream that is sent through the system to be decoded by videoconferencing client applications and/or devices for providing a live display of a remote participant or of content from the remote participant's computing device. The encoding can be provided for a video signal such as one originating from a video camera or "webcam" being used by the remote participant while in a videoconference. In real time, an encoder according to examples disclosed herein searches for an image block's best CFL prediction parameter(s) but limits the search to a specified range and allowing the search to be terminated early without evaluating every value within the range. In some examples, to further reduce computational complexity, computational cost is reduced by terminating the search if the current computational cost of the search becomes greater than the minimum computational cost.

A system according to some examples can receive an input video signal at a client device, for example, a computing device being used to participate in an online video conference. For each coding block to which CFL intra prediction discussed herein is to be applied, a search range (e.g., a sub-range of a valid value range) and a starting value are set for a search directed to a linear model parameter for the chroma from luma intra prediction. The search range is divided into three parts by the starting value: the first part contains a first set of values on one side (larger or smaller) of the starting value within the search range; the second part contains a second set of values on the other side (smaller or larger) of the starting value; and the third part contains the starting point. The values in the first set and the second set are determined by offsetting a previous value by a step size. For example, the first set can include values that are higher than the starting value and the values are generated by increasing the starting value by the step size to generate the first value, subsequently increasing the first value by the step size to generate the second value, and so on. The values in each of the first set and second set follow a certain order, such as from the lowest to the highest or from the highest to the lowest.

The search is conducted from the starting value, for example, by calculating the value of a cost function when the parameter of the linear model is set to the starting value. The search continues to one set of values followed by the other set of values or by following a specific order for both sets of values. For example, the search can continue to the set of values that are higher than the starting value. The values in the set are examined one by one until the cost function is higher than the minimum cost obtained so far. If that happens, the search for the set of values is terminated (even if there are unexamined values in this set). The values in the other set are examined one by one until the cost function is higher than the minimum cost obtained so far. Likewise, there may be unexamined values in the set before the search is terminated. The value that corresponds to the minimum cost is selected for the parameter of the model. The video encoder uses the selected value of the CFL linear model parameter to encode the block.

Searches can be carried out separately for the U and V planes of the video frame being processed. The cost function can be a rate-distortion function, where the distortion values can be calculated based on a weighted average of the difference between the original block and the reconstructed block. The rate in the cost function can be the rate of the coding mode of the coding block. Other rate-distortion function or other cost function measurement techniques can also be used.

The encoding can be applied to intra-coded video frames (i-frames) and predicated frames (p-frames). An encoding module that provides the CFL intra prediction in video coding as described herein may be used in, as examples, Web-based videoconferencing or videoconferencing applications installed for desktop and notebook computers, or in an "app" (application) for deployment to smartphones or tablet computers.

The techniques disclosed herein for providing CFL intra prediction in video coding enable improved bandwidth efficiency while maintaining quality in videoconferences. Establishing a more efficient, real time search process for parameters used in CFL prediction can reduce computational cost, and the transmission efficiency of the video stream can be improved. The encoding can be used with any type of camera or video capture device.

This illustrative example is given to introduce the reader to the general subject matter discussed herein and the disclosure is not limited to this example. The following sections describe various additional non-limiting examples and examples of systems and methods for providing fast parameter search for chroma from luma intra prediction.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
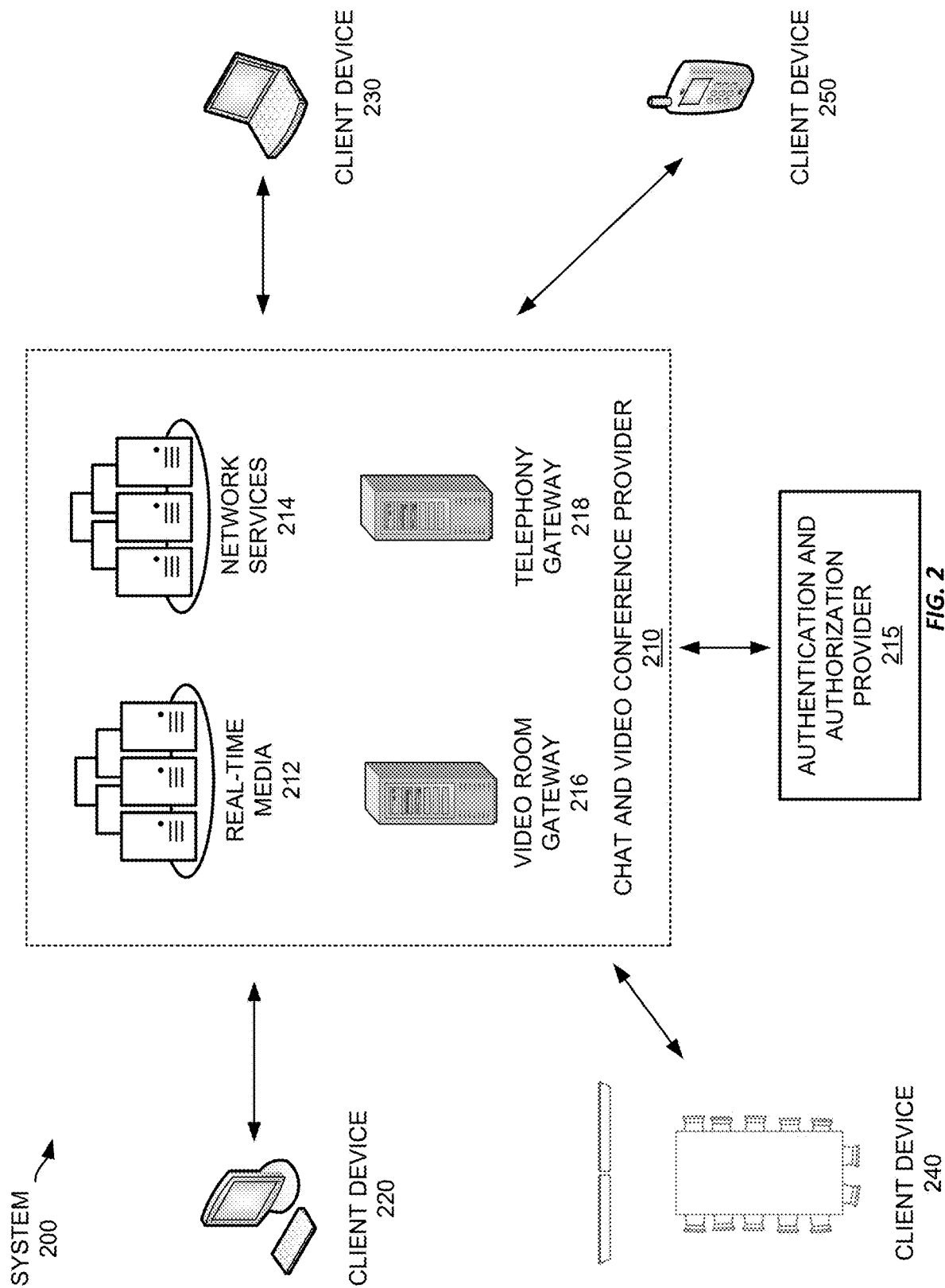

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
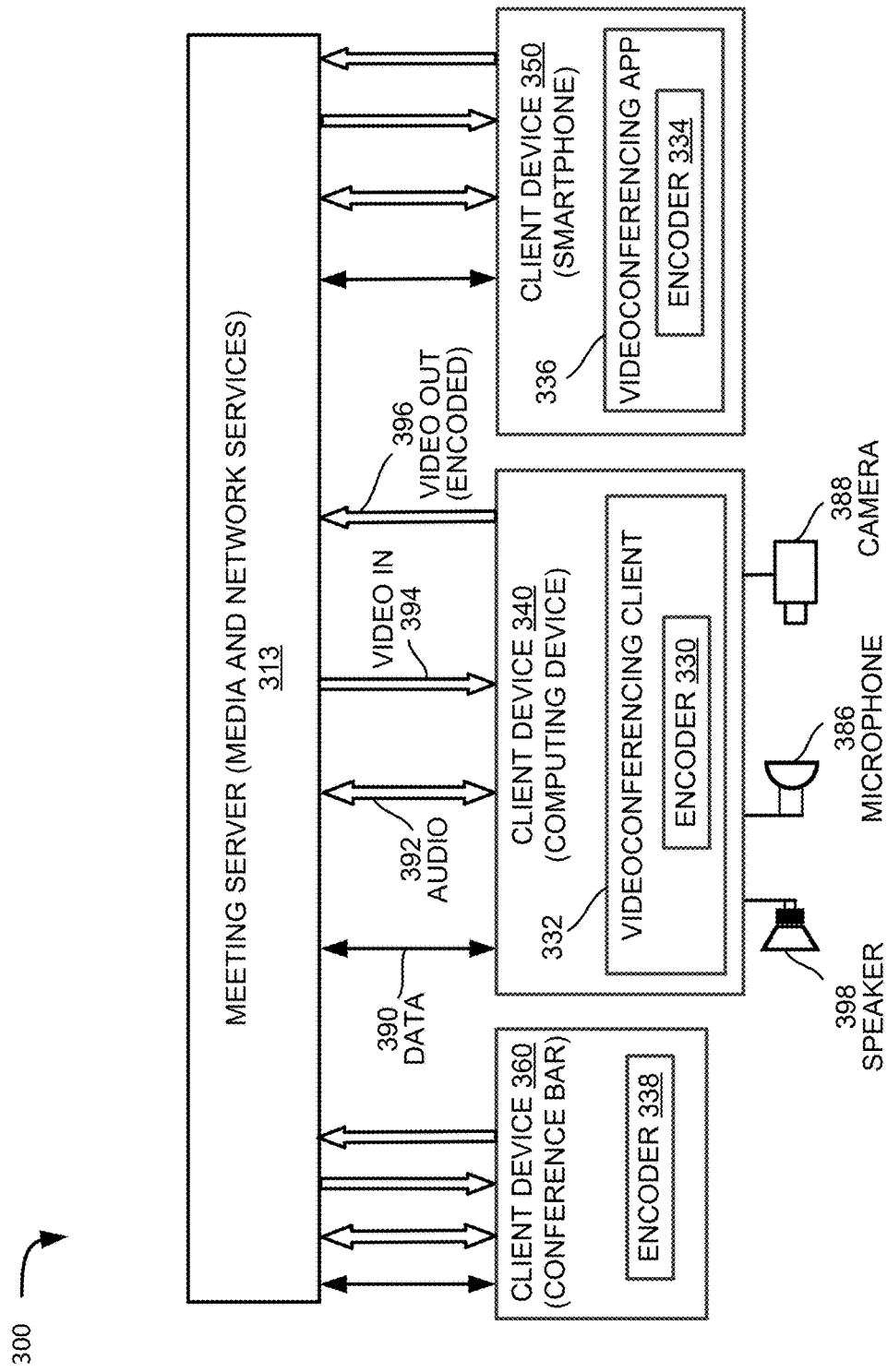

Referring to FIG. 3, FIG. 3 shows example system 300. Example system 300 includes videoconferencing meeting server 313. Meeting server 313 may also be referred to as a multimedia router and can be implemented by the real-time media servers 212 working with the network services servers 214. The meeting server can keep track of the status of meetings without constantly exchanging this information with client devices.

System 300 includes an encoder module (encoder) 330 maintained on client device 340, which is coupled to meeting server 313 during a videoconferencing meeting. The encoder 330 is part of a videoconferencing client application 332 installed on client device 340, which in this example is a computing device such as a desktop or notebook computer. An encoder 334 is installed in client device 350, which in this example is a smartphone, but can be any suitable client device. Encoder 334 is part of a videoconferencing app 336. Encoder 338 is installed in client device 360, which in this example is conference bar, but can be any suitable client device. As an example, conference bar 360 may be used as the dedicated videoconferencing equipment in conference room 240. In some examples, a conference bar is a unitary device that can be wall or desk mounted. A conference bar can include a webcam, speaker, and microphone all in one and often has connections to add conference table speakers and/or microphones. Conference bar 360 in FIG. 3 includes microcode or firmware, which may implement encoder 338. Alternatively, an encoder chip may be provided in conference bar 360. For purposes of the discussion herein a codec, which is a combination of an encoder and a decoder, may be referred to as an encoder.

The various hardware configurations in use in a system such as system 300 may result in video input signals from various devices. These may include wired webcams connected to local computing devices via USB, cameras internal to notebook computers, tablet computers, smartphones, and conference bars or other kinds of dedicated conference room equipment. Video signals may also be generated internal to a computing device through screen sharing of documents, images, or incoming video feeds. An encoder that provides fast parameter search for chroma from luma intra prediction can be used with any of these sources.

In system 300, client devices maintain an active data connection 390 for any video or audio conference in which the host client device is participating. These data connections are illustrated with the single width, two-headed arrows in FIG. 3. The data connections are used for control, presence indication, chat, and other similar functions and can be maintained using TCP. Additionally, two-way audio streams carry audio between the meeting server 313 and the client devices. The two-way audio streams are shown with a double width, bidirectional arrow such as that shown for audio stream 392. Video received from the meeting server 313 at each client device shown is illustrated with a double-width, single-ended arrow such as that shown for video input from the network to client device 340, video stream 394. Video streams outgoing from the client devices, which are encoded by the encoder modules using fast parameter search for chroma from luma intra prediction, are illustrated by a similar double-width, single-ended arrow such as that shown for outgoing video stream 396. Audio and video streams, including the blocks and frames of outgoing video, can be transmitted over the network using UDP.

The encoders in system 300 can accept video signals originating from a camera connected to, built in to, or otherwise associated with the respective client device. For purposes of this example, client devices 350 and 360 have built-in microphones, speakers, and cameras, while client device 340 has an externally connected microphone 386, an externally connected camera 388, and an externally connected speaker 398. Alternatively, the microphone 386 may be separate from the speaker 398, for example, a desk or boom microphone, or a microphone that is part of the camera 388. A digital stream including encoded video frames is delivered to meeting server 313 after encoding.

Figure 4:
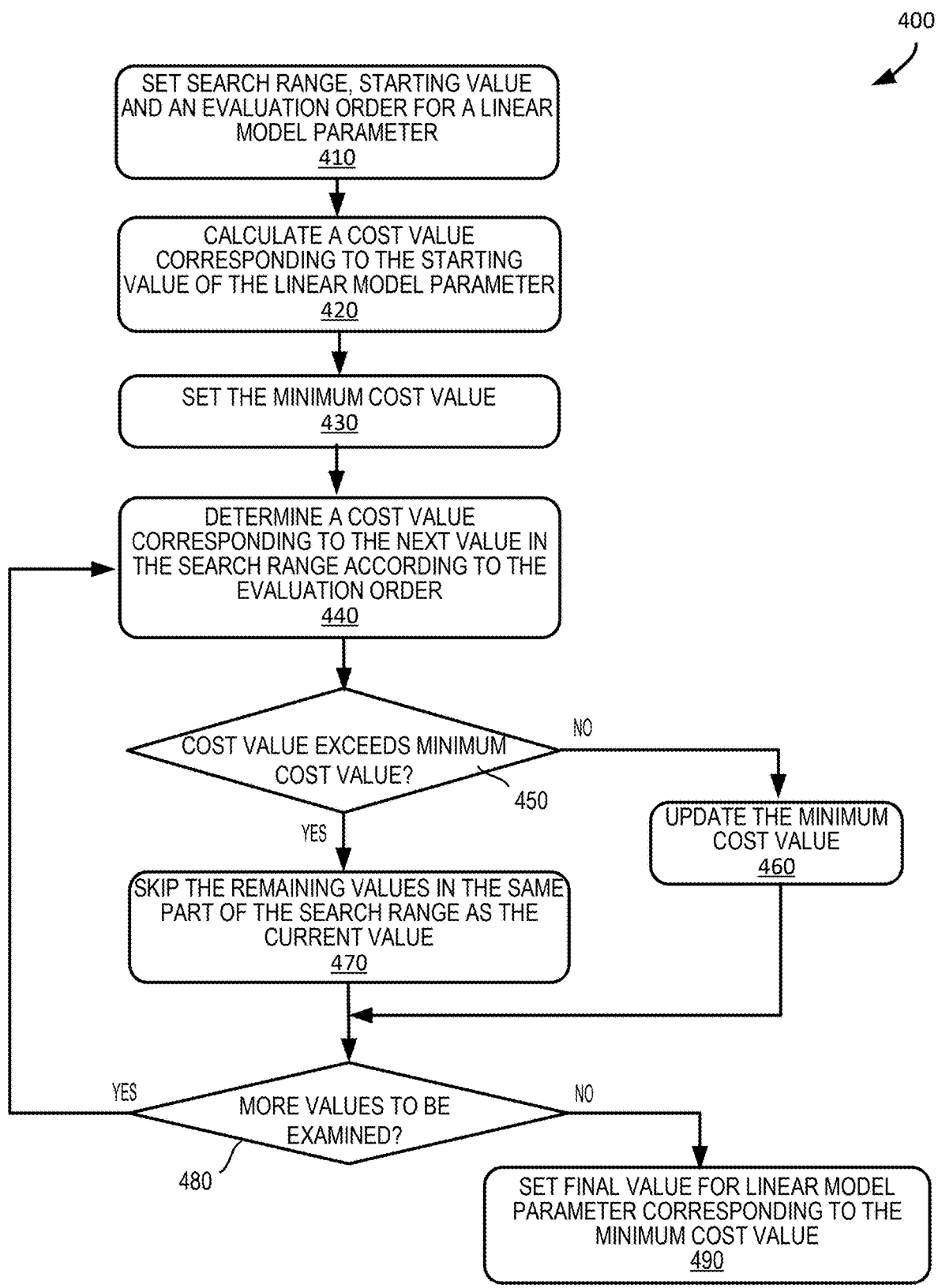
FIG. 4 illustrates an example method for providing fast parameter search for chroma from luma (CFL) intra prediction in video coding as described herein.

Referring now to the method illustrated in FIG. 4, FIG. 4 shows an example method 400 for providing fast parameter search for chroma from luma (CFL) intra prediction as described herein. The description of the method 400 in FIG. 4 will be made with reference to the system of FIG. 3. However, any suitable system according to this disclosure may be used, such as the example systems 100 and 200 shown in FIGS. 1 and 2. Ranges and limits described herein can include the concept of equality. Hence phrases like "less than" or "more than" can include "less than or equal to" and "more than or equal to" and a range of "from A to B" can include either or both of A and B. FIG. 4 will be described in conjunction with FIG. 5 where an example of the fast parameter search is illustrated.

CFL prediction is an intra prediction technique that models chroma (color) pixels as a linear function of coincident reconstructed luma (brightness) pixels. The intra prediction is guided by parameters, the values of which can be preselected, or selected during encoding. For example, linear model parameters such as alpha (a) and beta (8) define the slope and intercept values for a linear equation that can be used to predict chroma values from luma values. Method 400 can be carried out on a block-by-block basis for each block within an input video frame, or for blocks selected based on computational cost as compared to other prediction modes supported by the encoder for encoding the video stream.

At block 410, a processor or processors, for example, a processor such as processor 710 (discussed below with respect to FIG. 7) running in on or more client devices 340-360, sets a search range, a starting value, and an evaluation order for a search directed to a linear model parameter for chroma from luma (CFL) prediction for encoding an input video frame. The input video frame may be provided, for example, by camera 388. The parameter can be the parameter a of the linear CFL model discussed below in detail with respect to FIG. 6. The search range can be a sub-range or a portion of the valid value range for the parameter. For example, the parameter can take any value from −16 to 16, and the search range may be set to −6 to 6. The search range may be determined based on training using video samples having similar content as the video to be encoded using the video encoder. In examples of videoconferencing, the video used for training can be the videos of one or more users sitting in front of the camera with relative stable background. The training can determine a range of values of the parameter that this type of video uses during encoding. This range can be set as the search range.

The starting value can be a fixed value, such as the median of the search value, or a random value selected within the search range. By setting the starting value, the search range can be divided into three parts: the starting value, a part including values smaller than the starting value, and a part including values larger than the starting value. In the example shown in FIG. 5, the search range is [−3, 3] and the starting value is set to be 0. In this way, the search range is divided into three parts: one part 506 having values in the range [−3, −1], one part 502 having value 0, and one part 504 having values in the range [1, 3]. The processor further sets an evaluation order for the values in the search range starting with the starting value. For example, the evaluation order can be the starting value followed by one part of the values (e.g., in an increasing order or a decreasing order) and then another part of the values (e.g., in an increasing order or a decreasing order). In the example shown in FIG. 5, the evaluation order can be {0, 1, 2, 3, −1, −2, −3}, {0, −1, −2, −3, 1, 2, 3}, {0, −3, −2, −1, 3, 2, 1}, or {0, 3, 2, 1, −3, −2, −1}. In other examples, the evaluation order can be set by intervening the values from the two parts, such as {0, −1, 1, −2, 2, −3, 3}.

In further examples, values to be evaluated in the search range are determined according to a step size. In the above examples, the step size is one. In other examples, the step size can be a dynamic value that changes for different values. For example, the values to be evaluated can be {0, 1, 3, −1, −3} where the step size is one between 0 and 1 (and 0 and −1) and becomes 2 between 1 and 3 (and −1 and −3).

At block 420, the processor calculates a cost value corresponding to the starting value of the linear model parameter. The cost value can be any measurement that measures the cost associated with a value of the parameter. For example, the cost can be defined as the rate, the distortion, or a combination thereof as will be discussed later. At block 430, the processor sets the minimum cost value to be the current cost value, that is, the cost value of the starting value.

At block 440, the processor determines a cost value corresponding to the next value in the search range according to the evaluation order set at block 410. At block 450, the processor determines whether the cost value exceeds the minimum cost value. If not, the processor updates the minimum cost value to be the current cost value at block 460 and determines, at block 480 whether there are more values to be evaluated. If, at block 450, the processor determines that the current cost value exceeds the minimum cost value, the processor skips the remaining unevaluated values in the same part of the search range where the current value resides. For instance, in the above examples, if the current value is 1 and its associated cost value exceeds the minimum cost value, the remaining unevaluated values in the part [1, 3] are skipped and no longer being evaluated. If the evaluation order is {0, 1, 2, 3, −1, −2, −3}, then the next value to be evaluated is −1. If the evaluation order is {0, −1, −2, −3, 1, 2, 3}, there will be no more values to be evaluated. If the evaluation order is {0, −1, 1, −2, 2, −3, 3}, 2 and 3 will be skipped and the next value is −2.

At block 480, the processor determines whether there are more values to be evaluated. If so, the processor evaluates the next value at block 440. If there are no more values to evaluated, the processor sets, at block 490, the final value for the linear model parameter to be the value that corresponds to the minimum cost value.

Figure 5:
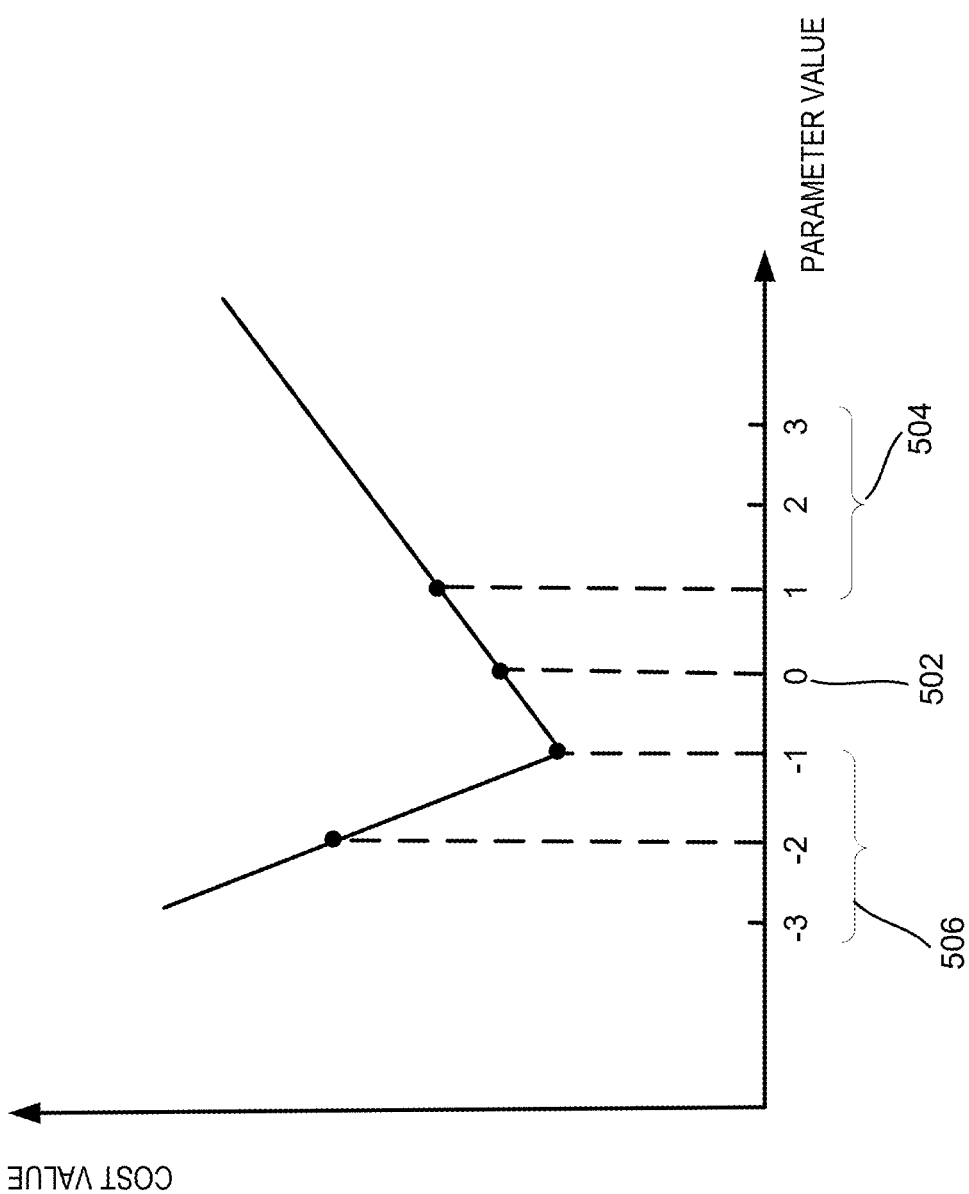
FIG. 5 illustrates an example of the fast parameter search as described herein.

In the example shown in FIG. 5, if the evaluation sequence is {0, 1, 2, 3, −1, −2, −3}, the processor calculates the lost value for the starting value 0 and set the cost value as the minimum cost value. The processor moves on to value 1 to determine its cost value. When the processor determines that the cost value at parameter value 1 is larger than the minimum cost value, the processor skips the rest values in the part 504 (i.e., 2 and 3), and continues to evaluate the next value in part 506—value −1. The processor determines that the cost value at value −1 is smaller than the current cost value and updates the minimum cost value to be the current cost value. The processor continues to evaluate the next value in the search range, −2, and determines that the cost value at −2 is higher than the minimum cost value. The processor skips the rest values in part 506 (i.e., −3) and exist the search.

As can be seen from FIGS. 4 and 5, the search can be terminated early (before all the parameter values are evaluated) if the current cost value exceeds the minimum cost value. This reduces the computational complexity and thereby speeds up the encoding process. For chroma, the linear model parameter can be different for the U and V planes of the input video frame. Therefore, the search for the parameter value for one plane may terminate early while the search for the parameter value for the other plane may not.

Figure 6:
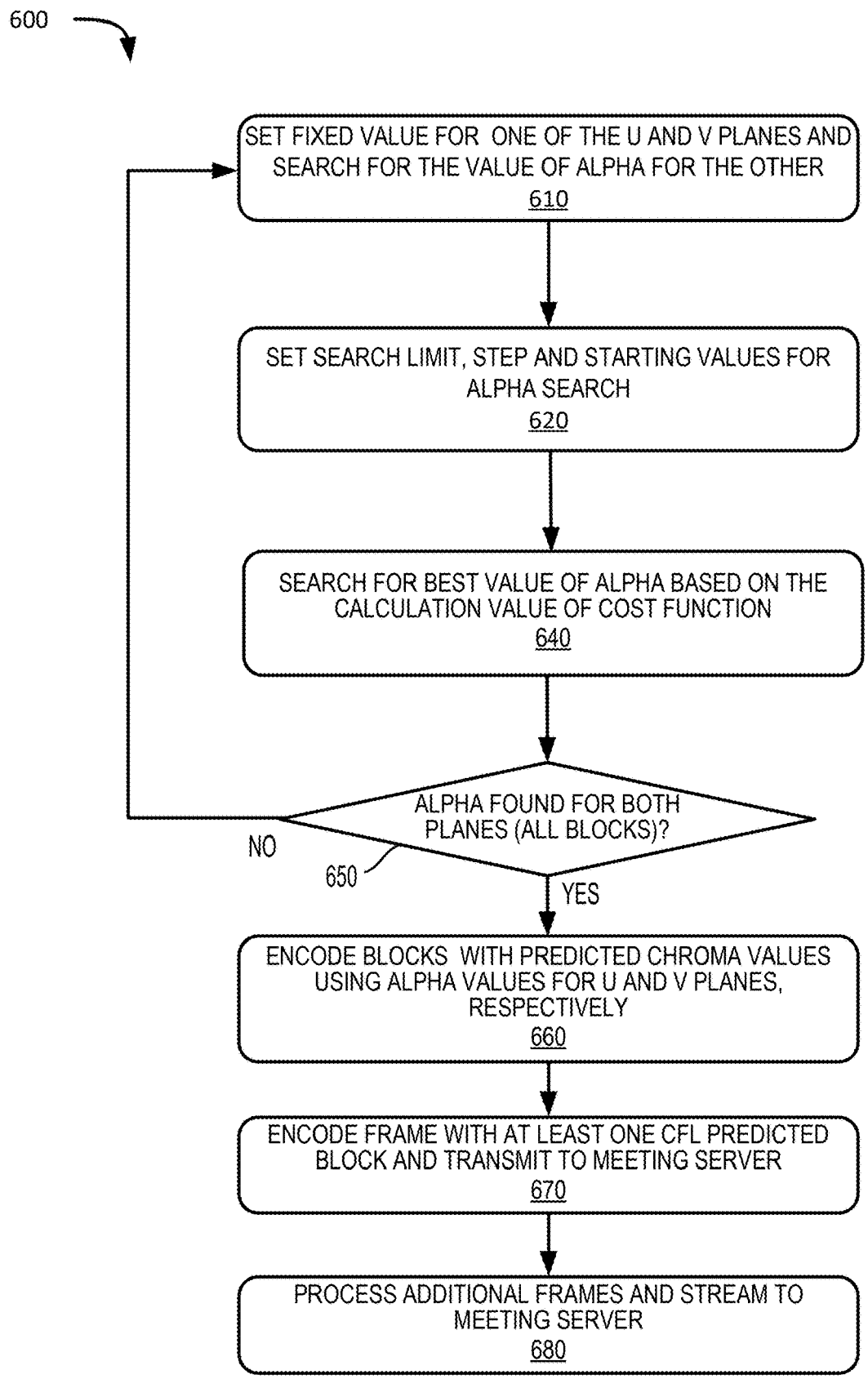
FIG. 6 illustrates an example method for encoding and transmitting a videoconferencing video stream using chroma from luma (CFL) intra prediction in video coding as described herein.

Referring now to the method illustrated in FIG. 6, FIG. 6 shows an example method 600 for providing a video stream for a participant in a videoconference at a client device using chroma from luma intra prediction as described herein. The description of the method 600 in FIG. 6 will be made with reference to the system of FIG. 6. However, any suitable system according to this disclosure may be used, such as the example systems 100 and 200 shown in FIGS. 1 and 2.

In this example, a processor or processors, for example, a processor such as processor 710 (discussed below with respect to FIG. 7) running in on or more client devices 340-360, at block 610, sets a fixed value for the linear model parameter of interest in a first one of the U or V planes for the video block being encoded, and initiates a search for the best value in the other plane. The parameter for the first plane may be referred to herein as a first linear model parameter and the parameter for the second plane may be referred to herein as a second linear model parameter since the parameter may have different final values in each plane. As an example, the search in FIG. 6 is for the best value of the linear model parameter a (alpha) for each plane of the video frame. The parameter a is a weight that determines the hue (including anti-hue) selected across a two-dimensional space to be scaled and applied according to luma value.

The chroma from luma intra prediction process uses reconstructed luma samples to form a prediction for the chroma samples. The high frequencies are taken from the reconstructed luma samples $L_r$ and combined with predicted DC chroma samples $C_{dc}$. The chroma pixel prediction, $C_p$, produced by CFL prediction uses the following linear equation:

$$C_p = \alpha * L_r + C_{dc}. \quad (1)$$

$\alpha$ is not constant block-to-block, and its values can be included in the video stream for use in a CFL decoder to reconstruct the video at a receiving device. The value can dictate the weight of luma values. The U and V plane in this example each has its own value for $\alpha$. The search limit value is set to 16 in this example, so that, for example, the valid value range of alpha is (−x,x), x=16 and the chroma from luma intra prediction in this example otherwise follows the Alliance for Open Video One (AV1) standard for coding and decoding. The best search range will provide a trade-off between speed and performance while maintaining high quality. In other examples, the search limit value can be set anywhere from 10 to 20. The value may be hard coded into an encoder or may be selected based on settings input to the video processing application or system.

In some examples of chroma from luma prediction following a standard such as AV1, only some blocks will be selected for encoding in CFL prediction mode, while other blocks in a frame will not be selected. Chroma from luma prediction mode is just one of the intra prediction modes for the chroma plane. For an intra coding block, CFL prediction and other intra prediction modes can be tried, and the final intra prediction mode of the block can be selected according to the mode with the minimum computational cost. A CFL predictor can be a part of the encoder; the predicted pixels are used to calculate residuals, which are further transformed and quantized. Such an encoder can be organized following a hybrid coding technology framework, of which CFL prediction is one part. After prediction, quantization and transformation of the prediction residuals can be performed.

At block 620 of FIG. 6, the processor sets the search range, a starting value, and the evaluation order for the search directed to the best value of a for the second plane of the input video frame. Block 620 can be performed as described in FIG. 4. The search for the best value of $\alpha$ in the u plane ($\alpha_u$) can be carried out and the search in the v plane for ($\alpha_v$) follows the same process.

At block 630, the processor determines the best value for a by calculating cost values as described above with respect to FIG. 4. In some examples, the cost values are the values of a rate-distortion cost function determined based on a combination of a rate and a distortion. The rate can be the rate of the coding mode of the coding block. The distortion can be calculated using the sum of square errors (SSE) or the sum of absolute transformed differences (SATD) technique. The cost calculation technique can be hard coded into the encoder or can be selected based on external video settings.

For CFL parameter for the U plane $\alpha_u$, distortion $D_U$ is determined between prediction values and source values for the u plane. The same distortion criterion will be used to calculate Distortion $D_V$ with $\alpha_v$ for the V plane. D=$D_U+D_V$. The CFL prediction mode bits with $\alpha_u$ and $\alpha_v$ are calculated as R. In this example where the parameter for U plane is determined, $\alpha_v$ is fixed, V's prediction value will not change, therefore $D_v$ is a constant value. Likewise, when the parameter for V plane is determined, $\alpha_u$ is fixed, U's prediction value will not change, therefore $D_u$ is a constant value.

The cost function parameter $\lambda$ in this example is also a constant value. When $\alpha_u$ changes, $\lambda$ will generate different prediction values for the u plane, leading to a different distortion $D_u$, rate R, and cost value C:

$$C = \lambda * R + D = \lambda * R + D_U + D_V. \quad (2)$$

At block 650 of FIG. 6, when the value of a for one of the U plane or the V plane is being selected, the value of the second linear model parameter, that is, the value of a for the second plane of the input video frame is fixed. The searching process then repeats beginning at block 610 of FIG. 6 for the final value of the second linear model parameter a for the second plane. This process can be performed for each coding block of the input video frame.

Continuing with the example of FIG. 6, once the best values have been selected for each of the U and V planes of all blocks of the input video frame (e.g., an I-frame or a P-frame), the values are used at block 660 to produce, using predicted chroma values with the selected values for $\alpha$, a coded video frame corresponding to the input video frame. The chroma from luma intra prediction can be carried out, for example, by one or more of encoders 330 through 338. At block 670, the processor encodes and subsequently transmits the encoded frame. For example, the processor in one of the client devices transmits the encoded frame as part of video out 396 to meeting server 313. At block 680, the processor generates and transmits additional encoded frames from additional, sequential input frames, to meeting server 313. This example process works well with encoders designed for relatively high-performance hardware. In some systems, another encoder may be selected by a client device or app based on detected hardware performance.

Figure 7:
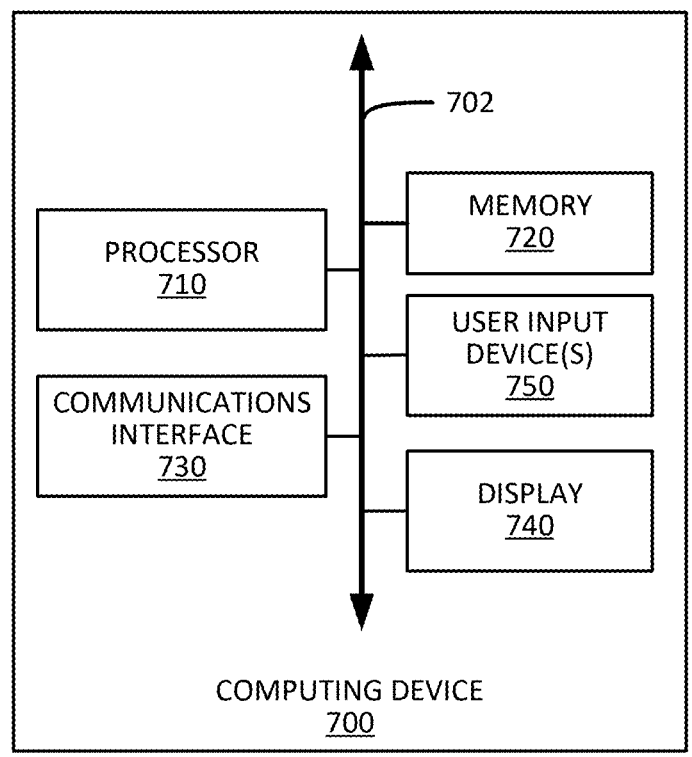
FIG. 7 shows an example computing device suitable for use with any disclosed systems or methods according to this disclosure.

Referring now to FIG. 7, FIG. 7 shows an example computing device 700 suitable for use in example systems or methods for providing chroma from luma intra prediction as described herein. The example computing device 700 includes a processor 710 which is in communication with the memory 720 and other components of the computing device 700 using one or more communications buses 702. The processor 710 is configured to execute processor-executable instructions stored in the memory 720 to perform one or more methods for providing fast parameter search for chroma from luma intra prediction. The computing device, in this example, also includes one or more user input devices 750, such as a keyboard, mouse, touchscreen, video input device (e.g., one or more cameras), microphone, etc., to accept user input, for example user input directed to activating or interacting with a videoconferencing application such as videoconferencing client device 340 or videoconferencing app 336. The computing device 700 also includes a display 740 to provide visual output to a user.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

As used below, any reference to a series of examples is to be understood as a reference to each of those examples disjunctively (e.g., "Examples 1-4" is to be understood as "Examples 1, 2, 3, or 4").

Example #1: a method comprising: determining a value of a parameter of a linear chroma from luma (CFL) predictor for a coding block of a frame of a video, the parameter of the linear CFL having a value range, the determining comprising: determining a search range within the value range, the search range being divided into three portions by a starting value within the search range, a first portion containing a first set of values on one side of the starting value within the search range, a second portion containing a second set of values on the other side of the starting value within the search range, and a third portion containing the starting value; determining an initial cost value of a cost function defined for the coding block by setting the parameter to the starting value; determining a first cost value of the cost function by setting the parameter to a first value within the first set of values; determining a second cost value of the cost function by setting the parameter to a second value within the second set of values; and determining the value of the parameter as one of the starting value, the first value, or the second value that corresponds to a lowest cost value among the initial cost value, the first cost value, and the second cost value; and encoding the coding block of the frame into a bitstream representing the video using the CFL predictor with the determined value of the parameter.

Example #2: the method of Example #1, wherein the starting value is a fixed value or randomly selected from the search range.

Example #3: the method of Examples #1-2, wherein the first set of values is a first ordered set of values determined by offsetting a previous value starting from the starting value by a step size, and wherein the first value is determined by: calculating a first candidate cost value for a first candidate value in the first set of values; determining the first candidate value as the first value based on the first candidate cost value being larger than a current minimum cost value or based on the first candidate cost value being lower than the current minimum cost value and lower than a cost value for a value in the first ordered set of values that is immediately after the first candidate value; or determining a second candidate value as the first value for the parameter based on the first candidate cost value being no larger than the current minimum cost value, wherein the second candidate value is after the first candidate value in the first ordered set of values, and a cost value for the second candidate value is lower than a cost value for a value in the first ordered set of values that is immediately after the second candidate value.

Example #4: the method of Examples #1-3, wherein the step size between two consecutive values in the first ordered set of values is a fixed value or a varying value.

Example #5: the method of Examples #1-4, wherein the cost function is a rate distortion cost determined based on a combination of a rate and a distortion.

Example #6: the method of Examples #1-5, wherein the distortion is determined by calculating distortion values based on at least one of a sum of squared errors or a sum of absolute transformed differences.

Example #7: the method of Examples #1-6, wherein the rate comprises a rate of a coding mode of the coding block.

Example #8: A system comprising: a processor; and at least one memory device including instructions that are executable by the processor to cause the processor to: set a search range, a starting value and an evaluation order for determining a linear model parameter for a chroma from luma (CFL) predictor for encoding a coding block of an input video frame, the search range being divided into three portions by a starting value within the search range, a first portion containing a first set of values on one side of the starting value within the search range, a second portion containing a second set of values on the other side of the starting value within the search range, and a third portion containing the starting value; search for a final value of the linear model parameter by causing the processor to: determine a first cost value of a cost function corresponding to a first value in the search range according to the evaluation order, the first value belonging to the first portion; skip remaining values in the first portion based on the first cost value being higher than a minimum cost value; determine a second cost value of the cost function corresponding to a second value in the second portion of the search range according to the evaluation order; update the minimum cost value based on the second cost value being lower than the minimum cost value; and determine the final value of the linear model parameter as a value in the search range that corresponds to the minimum cost value; and encode the coding block of the frame into a bitstream representing the video using the CFL predictor with the determined final value of the linear model parameter.

Example #9: the system of Example #8, wherein the starting value is a fixed value or randomly selected from the search range.

Example #10: the system of Examples #8-9, wherein the second value in the second portion of the search range is a next unevaluated value in the second set of values according to the evaluation order.

Example #11: the system of Examples #8-10, wherein a step size between two consecutive values in the first set of values or the second set of values is a fixed value or a varying value.

Example #12: the system of Examples #8-11, wherein the cost function is a rate distortion cost determined based on a combination of a rate and a distortion.

Example #13: the system of Examples #8-12, wherein the distortion is determined by calculating distortion values based on at least one of a sum of squared errors or a sum of absolute transformed differences.

Example #14: the system of Examples #8-12, wherein the rate comprises a rate of a coding mode of the coding block.

Example #15: a non-transitory computer-readable medium comprising program code that is executable by one or more processors to cause the one or more processors to: set a search range, a starting value and an evaluation order for determining a linear model parameter for a chroma from luma (CFL) predictor for encoding a coding block of an input video frame, the search range being divided into three portions by a starting value within the search range, a first portion containing a first set of values on one side of the starting value within the search range, a second portion containing a second set of values on the other side of the starting value within the search range, and a third portion containing the starting value; search for a final value of the linear model parameter by causing the processor to: determine a first cost value of a cost function corresponding to a first value in the search range according to the evaluation order, the first value belonging to the first portion; skip remaining values in the first portion based on the first cost value being higher than a minimum cost value; determine a second cost value of the cost function corresponding to a second value in the second portion of the search range according to the evaluation order; and update the minimum cost value based on the second cost value being lower than the minimum cost value; determine the final value of the linear model parameter as a value in the search range that corresponds to the minimum cost value; and encode the coding block of the frame into a bitstream representing the video using the CFL predictor with the determined final value of the linear model parameter.

Example #16: the non-transitory computer-readable medium of Example #15, wherein the starting value is a fixed value or randomly selected from the search range.

Example #17: the non-transitory computer-readable medium of Examples #15-16, wherein the second value in the second portion of the search range is a next unevaluated value in the second set of values according to the evaluation order.

Example #18: the non-transitory computer-readable medium of Examples #15-17, wherein a step size between two consecutive values in the first set of values or the second set of values is a fixed value or a varying value.

Example #19: the non-transitory computer-readable medium of Examples #15-18, wherein the cost function is a rate distortion cost determined based on a combination of a rate and a distortion.

Example #20: the non-transitory computer-readable medium of Examples #15-19, wherein the distortion is determined by calculating distortion values based on at least one of a sum of squared errors or a sum of absolute transformed differences.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in at least one memory device, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
    determining a value of a parameter of a linear chroma from luma (CFL) predictor for a coding block of a frame of a video, the parameter of the linear CFL having a value range, the determining comprising:
        determining a search range within the value range, the search range being divided into three portions by a starting value within the search range, a first portion containing a first set of values on one side of the starting value within the search range, a second portion containing a second set of values on the other side of the starting value within the search range, and a third portion containing the starting value;
        determining an initial cost value of a cost function defined for the coding block by setting the parameter to the starting value;
        determining a first cost value of the cost function by setting the parameter to a first value within the first set of values;
        determining a second cost value of the cost function by setting the parameter to a second value within the second set of values; and
        determining the value of the parameter as one of the starting value, the first value, or the second value that corresponds to a lowest cost value among the initial cost value, the first cost value, and the second cost value; and
    encoding the coding block of the frame into a bitstream representing the video using the CFL predictor with the determined value of the parameter.

2. The method of claim 1, wherein the starting value is a fixed value or randomly selected from the search range.

3. The method of claim 1, wherein the first set of values is a first ordered set of values determined by offsetting a previous value starting from the starting value by a step size, and wherein the first value is determined by:
  calculating a first candidate cost value for a first candidate value in the first set of values;
  determining the first candidate value as the first value based on the first candidate cost value being larger than a current minimum cost value or based on the first candidate cost value being lower than the current minimum cost value and lower than a cost value for a value in the first ordered set of values that is immediately after the first candidate value; or
  determining a second candidate value as the first value for the parameter based on the first candidate cost value being no larger than the current minimum cost value, wherein the second candidate value is after the first candidate value in the first ordered set of values, and a cost value for the second candidate value is lower than a cost value for a value in the first ordered set of values that is immediately after the second candidate value.

4. The method of claim 3, wherein the step size between two consecutive values in the first ordered set of values is a fixed value or a varying value.

5. The method of claim 1, wherein the cost function is a rate distortion cost determined based on a combination of a rate and a distortion.

6. The method of claim 5, wherein the distortion is determined by calculating distortion values based on at least one of a sum of squared errors or a sum of absolute transformed differences.

7. The method of claim 5, wherein the rate comprises a rate of a coding mode of the coding block.

8. A system comprising:
  a processor; and
  at least one memory device including instructions that are executable by the processor to cause the processor to:
    set a search range, a starting value and an evaluation order for determining a linear model parameter for a chroma from luma (CFL) predictor for encoding a coding block of an input video frame, the search range being divided into three portions by a starting value within the search range, a first portion containing a first set of values on one side of the starting value within the search range, a second portion containing a second set of values on the other side of the starting value within the search range, and a third portion containing the starting value;
    search for a final value of the linear model parameter by causing the processor to:
      determine a first cost value of a cost function corresponding to a first value in the search range according to the evaluation order, the first value belonging to the first portion;
      skip remaining values in the first portion based on the first cost value being higher than a minimum cost value;
      determine a second cost value of the cost function corresponding to a second value in the second portion of the search range according to the evaluation order;
      update the minimum cost value based on the second cost value being lower than the minimum cost value; and
      determine the final value of the linear model parameter as a value in the search range that corresponds to the minimum cost value; and
    encode the coding block of the frame into a bitstream representing the video using the CFL predictor with the determined final value of the linear model parameter.

9. The system of claim 8, wherein the starting value is a fixed value or randomly selected from the search range.

10. The system of claim 8, wherein the second value in the second portion of the search range is a next unevaluated value in the second set of values according to the evaluation order.

11. The system of claim 8, wherein a step size between two consecutive values in the first set of values or the second set of values is a fixed value or a varying value.

12. The system of claim 8, wherein the cost function is a rate distortion cost determined based on a combination of a rate and a distortion.

13. The system of claim 12, wherein the distortion is determined by calculating distortion values based on at least one of a sum of squared errors or a sum of absolute transformed differences.

14. The system of claim 12, wherein the rate comprises a rate of a coding mode of the coding block.

15. A non-transitory computer-readable medium comprising program code that is executable by one or more processors to cause the one or more processors to:
  set a search range, a starting value and an evaluation order for determining a linear model parameter for a chroma from luma (CFL) predictor for encoding a coding block of an input video frame, the search range being divided into three portions by a starting value within the search range, a first portion containing a first set of values on one side of the starting value within the search range, a second portion containing a second set of values on the other side of the starting value within the search range, and a third portion containing the starting value;
  search for a final value of the linear model parameter by causing the processor to:
    determine a first cost value of a cost function corresponding to a first value in the search range according to the evaluation order, the first value belonging to the first portion;
    skip remaining values in the first portion based on the first cost value being higher than a minimum cost value;
    determine a second cost value of the cost function corresponding to a second value in the second portion of the search range according to the evaluation order; and
    update the minimum cost value based on the second cost value being lower than the minimum cost value;
    determine the final value of the linear model parameter as a value in the search range that corresponds to the minimum cost value; and
  encode the coding block of the frame into a bitstream representing the video using the CFL predictor with the determined final value of the linear model parameter.

16. The non-transitory computer-readable medium of claim 15, wherein the starting value is a fixed value or randomly selected from the search range.

17. The non-transitory computer-readable medium of claim 15, wherein the second value in the second portion of the search range is a next unevaluated value in the second set of values according to the evaluation order.

18. The non-transitory computer-readable medium of claim 15, wherein a step size between two consecutive values in the first set of values or the second set of values is a fixed value or a varying value.

19. The non-transitory computer-readable medium of claim 15, wherein the cost function is a rate distortion cost determined based on a combination of a rate and a distortion.

20. The non-transitory computer-readable medium of claim 19, wherein the distortion is determined by calculating distortion values based on at least one of a sum of squared errors or a sum of absolute transformed differences.

* * * * *